June 6, 1972  R. G. SPRECHER  3,667,806
AUTOMATIC LOCKING RESTRAINT BELT LINEAR RETRACTOR
Filed Sept. 3, 1970  2 Sheets-Sheet 1
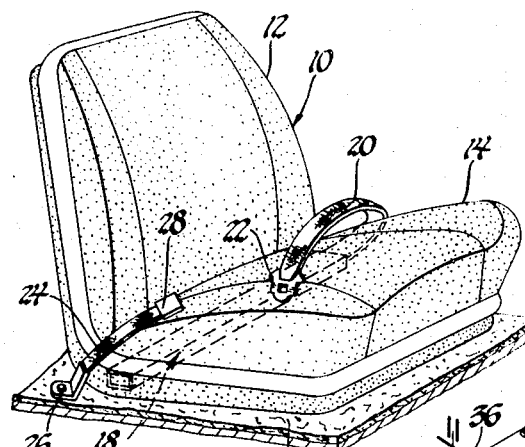
Fig.1
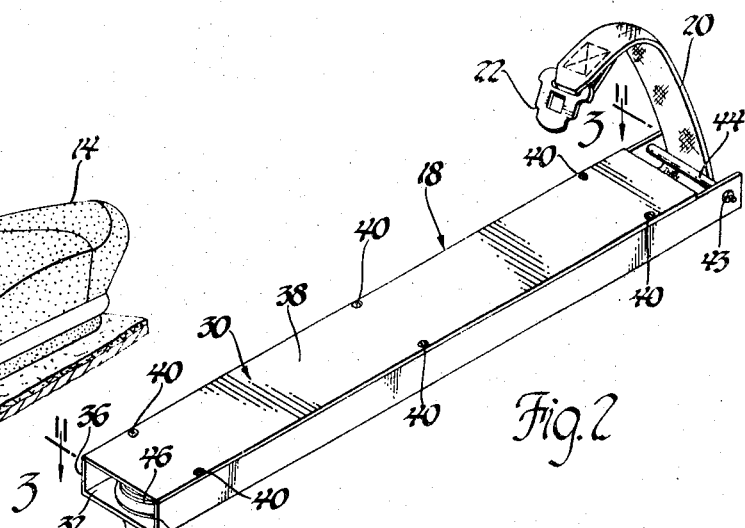
Fig.2
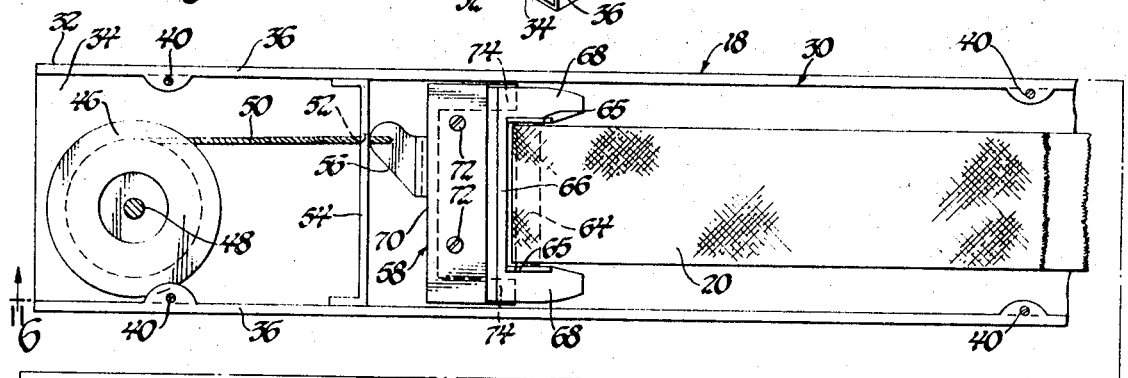
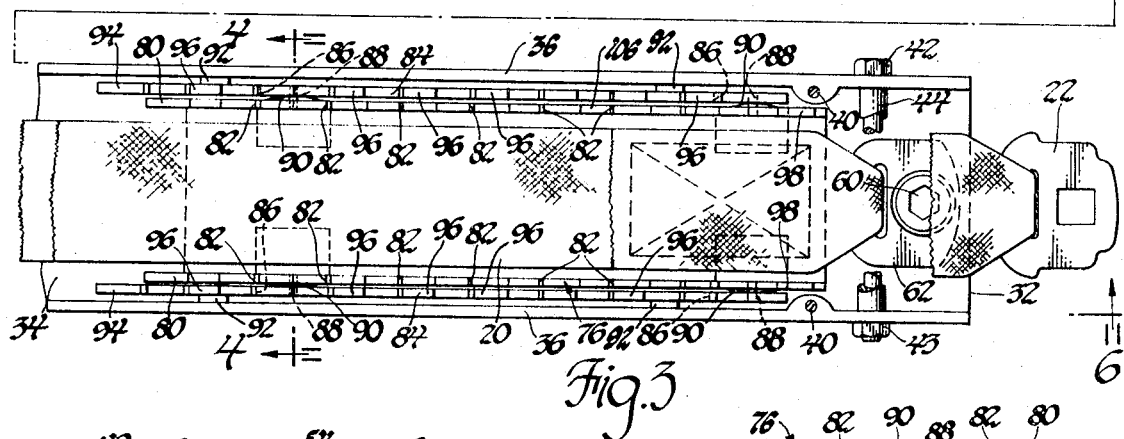
Fig.3
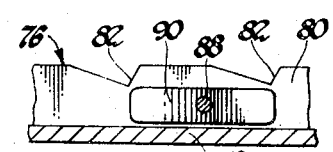
Fig.5
Fig.4
INVENTOR
Raymond G. Sprecher
BY
Herbert Furman
ATTORNEY

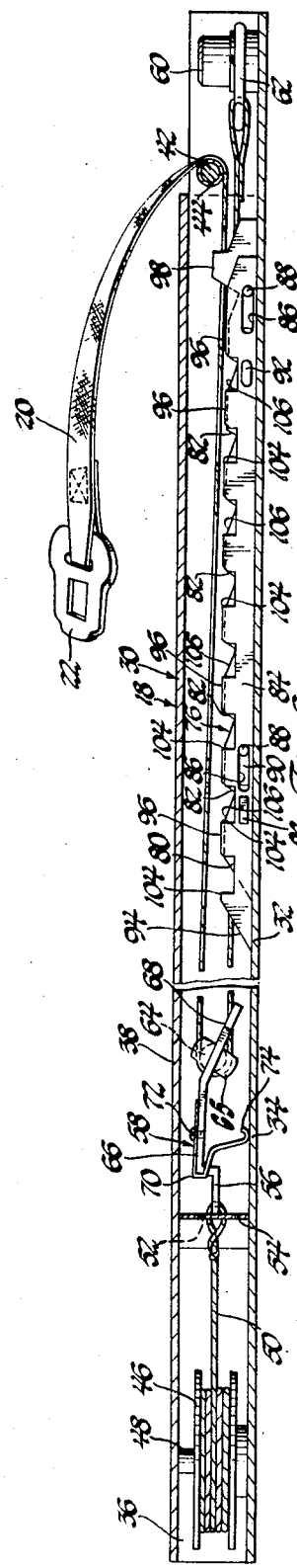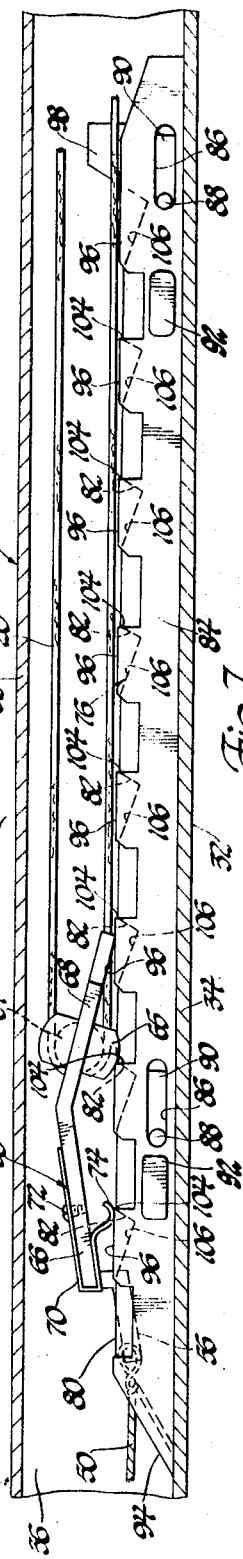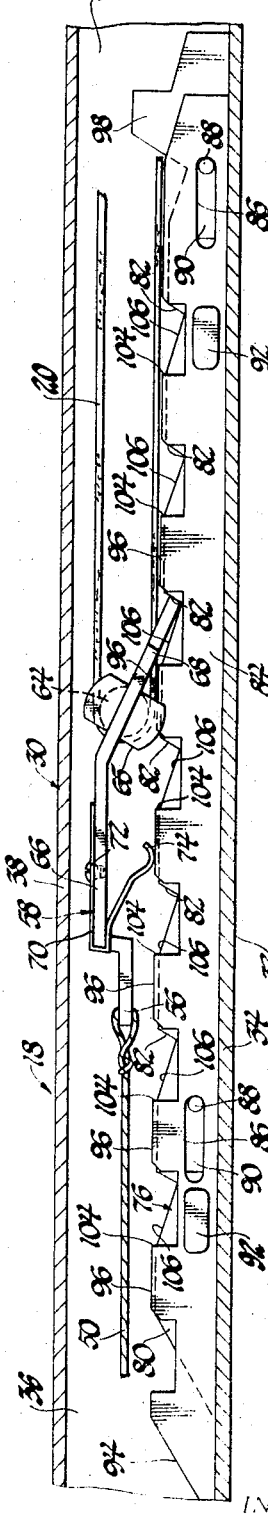

_United States Patent Office_ 3,667,806
Patented June 6, 1972

3,667,806
AUTOMATIC LOCKING RESTRAINT BELT LINEAR RETRACTOR
Raymond G. Sprecher, Detroit, Mich., assignor to General Motors Corporation, Detroit, Mich.
Filed Sept. 3, 1970, Ser. No. 69,363
Int. Cl. A47c *31/00;* A62b *35/00;* B60r *21/10*
U.S. Cl. 297—388         5 Claims

ABSTRACT OF THE DISCLOSURE

An automatic locking restraint belt linear retractor includes a generally fork-like carrier that has a base with spaced pawl legs extending therefrom and spring biased toward the base wall of the retractor housing. Movement of the free end of a restraint belt outwardly of the housing moves the belt from a fully stowed position within the housing and concomitant therewith moves the carrier from a fully retracted position toward a successive series of extended positions. During movement of the carrier to the first extended position of the series from an intermediate position slightly retracted therefrom, the spring bias causes the pawl legs to engage and move respective blocking members from unblocked positions to blocked positions in which the blocking members block engagement of the pawl legs and linear ratchet walls of a channel-shaped linear ratchet member mounted on the base wall. With the blocking members in blocked positions, the carrier is thus free to move to any extended position of the series and upon the initial retracting movement therefrom, the pawl legs engage and move the blocking members to unblocked positions to allow engagement of the pawl legs and the ratchet walls whereupon a subsequent outwardly applied belt force pivots the base of the carrier into engagement with the cover wall of the housing to hold the carrier from further extending movement and the free end of the belt from corresponding movement outwardly of the housing.

---

This invention relates to an automatic locking restraint belt linear retractor in which the carrier is freely movable to any of a successive series of extended positions from an intermediate position slightly retracted from the first extended position of the series, and more particularly, to such a retractor in which the initial retracting movement from any extended position of the series prevents subsequent movement to any further extended position.

In automatic locking restraint belt linear retractors, movement of the free end of a restraint belt outwardly of the retractor housing moves the belt from a fully stowed position within the housing and concomitant therewith moves a carrier from a fully retracted position toward a successive series of extended positions in which engagement of pawl and linear ratchet members on the carrier and the housing prevent further extending movement of the carrier and corresponding movement of the free end of the belt outwardly of the housing. To allow the carrier to move to each extended position of the series, blocking members in blocked positions block engagement of the pawl and linear ratchet members to thereby allow the movement of the carrier to each extended position of the series and corresponding movement of the free end of the belt outwardly of the housing. In one type of these retractors, the blocking members are moved to unblocked positions upon the initial retracting movement of the carrier in any position thus preventing movement of the free end of the belt outwardly of the housing subsequent to the initial inward movement thereof. Movement of the belt to the fully stowed position within the housing and corresponding movement of the carrier to the fully retracted position moves the blocking members to blocked positions to subsequently allow outward movement of the free end of the belt and movement of the carrier to any extended position of the series. In another type of these retractors, movement of the free end of the belt outwardly of the housing until the carrier is slightly extended from the last position of the series and subsequent retracting movement therefrom moves the blocking members from blocked positions to unblocked positions to allow engagement of the pawl and linear ratchet members. Thereafter, retracting movement of the carrier to any extended position prevents extending movement of the carrier to any further extended position and corresponding outward movement of the belt. Upon retraction of the carrier to the fully retracted position and corresponding movement of the belt to the fully stowed position, a subsequent initial extending movement of the carrier moves the blocking members to blocked positions to block engagement of the pawl and linear ratchet members.

When automatic locking restraint belt linear retractors are used to stow a restraint belt that is selectively and alternately attached to and detached from another restraint belt of correspondingly shorter length and when these retractors are used to stow shoulder belts, there is a considerable length of travel of the carrier between the fully retracted position and the first extended position of the series. Consequently, if the occupant mistakenly allows retraction of the carrier to a retracted position in which the length of the belt that extends outwardly of the housing is shorter than required, the restraint belt must be moved a considerable distance to move the carrier to the fully retracted position to thus allow the movement of the blocking members to blocked positions and subsequent movement of the carrier to a further extended position in which the length of the belt that extends outwardly of the housing corresponds to the required length. Also, due to the variance in size among various persons, there is a considerable length of travel of the carrier between the first and last extended positions of the series. Consequently, when engagement of the pawl and ratchet members in the first extended position is desired, it is somewhat inconvenient to have to move the belt outwardly of the housing until the carrier is slightly extended from the last extended position of the series.

This invention provides an improved automatic locking restraint belt linear retractor in which the carrier is freely movable to any extended position of the series from an intermediate position slightly retracted from the first extended position of the series and held from further extending movement upon the initial retracting movement from any extended position of the series.

An object of this invention is to provide an automatic locking restraint belt linear retractor which holds the belt from further outward movement after retraction of the carrier from any extended position of a series and which selectively allows further outward movement of the belt without first requiring the belt to assume a fully stowed position within the retractor housing.

In carrying out this object, the retractor includes blocking members that assume blocked positions with respect to linear ratchet walls during movement of the carrier to any extended position of the series from an intermediate position slightly retracted from the first extended position of the series.

In the preferred embodiment, the carrier has a generally fork-like configuration and spaced pawl legs thereof engage and move the blocking members to blocked positions upon movement of the carrier from the intermediate position to the first extended position of the series. Upon subsequent retracting movement of the carrier from any extended position of the series, the pawl legs engage and move the blocking members to unblocked positions to thereby prevent subsequent extending movement of the carrier and corresponding movement of the belt outwardly of the housing.

In the drawings:

FIG. 1 is a perspective view of a vehicle seat mounted on a vehicle floor that supports a dash-line indicated automatic locking restraint belt linear retractor according to the invention;

FIG. 2 is a perspective view of the retractor;

FIG. 3 is an enlarged partially broken away sectional view taken generally along line 3—3 of FIG. 2 with the carrier in fully retracted position and the belt in fully stowed position;

FIG. 4 is an enlarged sectional view taken generally along line 4—4 of FIG. 3;

FIG. 5 is a slightly enlarged partial sectional view taken generally along line 5—5 of FIG. 4;

FIG. 6 is a partially broken away sectional view taken generally along line 6—6 of FIG. 3 and with the blocking members in unblocked positions;

FIG. 7 shows an enlarged portion of the reactor as in FIG. 6 but with the carrier in one of the extended positions and with the blocking members in blocked positions;

FIG. 8 is similar to FIG. 7 but with the blocking members in unblocked positions and with the pawl legs of the carrier engaged with the linear ratchet walls of the channel-shaped linear ratchet member; and FIG. 9 shows a portion of one of the pawl legs of the carrier that includes a clip that engages a respective blocking member to move the blocking member to unblocked position.

Referring to FIG. 1, a conventional vehicle seat, generally indicated at 10, includes a seat back 12 and seat cushion 14. The seat 10 is conventionally mounted on a vehicle floor 16 on which is also mounted a dash-line indicated automatic locking restraint belt linear retractor 18. Linear retractor 18 is used to stow a first restraint belt 20 which has a D-ring 22 attached to the free end thereof. A second restraint belt 24 is of a correspondingly shorter length and has one end secured to the floor 16 by a terminal portion 26 and has a buckle 28 secured to the free end thereof. D-ring 22 and buckle 28 are selectively attached and detached to selectively strap and unstrap a vehicle occupant in seated position on seat 10. It should be noted that although the linear retractor 18 is herein mounted on a floor for use with a lap belt, it is also possible to mount the linear retractor of this invention at other locations for use with a shoulder belt.

Referring to FIG. 2, the linear retractor 18 includes a generally elongated housing 30 which has a channel member 32 that has a base wall 34 and side walls 36. A cover wall 38 extends between the upper edges of side walls 36 and is secured to the channel member 32 by screws 40. A bolt 42 extends between side walls 36 adjacent the right hand end of housing 30, as seen in FIG. 3, and is held in position by a nut 43. Bolt 42 rotatably supports a sleeve 44 over which belt 20 slides during retracting and extending movement to reduce the friction between the belt 20 and the right hand end of housing 30. Adjacent the left hand end of housing 30, a spring reel 46 is rotatably mounted by a pin 48. A cable 50 is wound around spring reel 46 and extends through an aperture 52 in a housing mounted plate 54 that extends between side walls 36 of housing 30. The cable 50 is secured to an attachment arm 56 of a generally fork-like carrier 58 to bias carrier 58 to a fully retracted position in which arm 56 engages plate 54 as in FIG. 3. A bolt 60 attaches a mounting plate 62 of belt 20 to housing 30 adjacent the righthand end thereof. With the carrier 58 in the fully retracted position, the belt 20 assumes a fully stowed position in which it extends from plate 62 along the longitudinal length of housing 30 and is looped over an attachment bar 64 of carrier 58 between spaced ears 65. The belt 20 extends from attachment bar 64 over sleeve 44 and outwardly of housing 30 adjacent the right hand end thereof.

When use of belt 20 is required, a force applied to the free end thereof moves carrier 58 longitudinally of housing 30 between fully retracted position, FIGS. 3 and 6, and a successive series of extended positions, FIGS. 7 and 8. During movement of carrier 58 from the fully retracted position to the last extended position of the series, the free end of belt 20 extends outwardly of housing 30 in increasing lengths as the generally U-shaped configuration of the belt is shortened from that of the fully stowed position.

It should be noted that it is also possible to secure the belt directly to the carrier in a retractor according to the invention. This does, however, have the disadvantageous effect of requiring a housing substantially twice as long as the housing herein disclosed for stowage of a belt of the same length.

Referring to FIGS. 3 and 6, the carrier 58 includes a base 66 which has spaced offset pawl legs 68 extending therefrom. A leaf spring 70, secured to base 66 by screws 72, includes spaced downwardly extending legs 74 that engage base wall 34 and bias base 66 toward cover wall 38 and pawl legs 68 toward base wall 34 such that carrier 58 is maintained in the position shown in FIG. 6.

A channel-shaped linear ratchet member 76 fits within the right hand portion of housing 30 and is secured thereto by screws 78 as seen in FIG. 4. Ratchet member 76 includes linear ratchet walls 80 which have ratchet surfaces 82 as best seen in FIGS. 5 and 8. Interposed between the ratchet walls 80 and the side walls 36 of housing 30 are longitudinally slidable blocking members 84. The blocking members 84 include longitudinally spaced slots 86 which receive respective ratchet wall mounted pins 88 to limit longitudinal sliding movement of blocking members 84 between unblocked positions, FIGS. 3, 6 and 8, and blocked positions, FIG. 7. As most clearly seen in FIGS. 3 and 5, curved leaf springs 90 fit between the ratchet walls 80 and the blocking members 84 and are apertured to receive pins 88. The springs 90 bias tabs 92 of blocking members 84 into frictional engagement with the side walls 36 and thus selectively and alternately maintain blocking members 84 in either the blocked or the unblocked positions against movement therebetween due to vehicle vibration.

With belt 20 in the fully stowed position, springs 90 maintain blocking members 84 in the unblocked positions. As the free end of belt 20 is moved outwardly of housing 30, carrier 58 moves from the fully retracted position of FIG. 6 toward the right to an intermediate position, not shown, where the bias of legs 74 of leaf spring 70 causes pawl legs 68 to initially frictionally engage blocking members 84 at ramp surfaces 94. During movement of carrier 58 from the intermediate position to the first extended position, the frictional engagement between pawl legs 68 and ramp surfaces 94 is sufficiently great to overcome the frictional engagement between tabs 92 and side walls 36 and to thus move blocking members 84 to the FIG. 7 blocked positions. With the blocking members 84 in the blocked positions, the pawl legs 68 ride along upper surfaces 96 of blocking members 84 to prevent engagement of the ends of pawl legs 68 with the surfaces 82 of ratchet walls 80. The carrier 58 can thus be moved along the ratchet member 76 until the length of belt 20 that extends outwardly of housing 30 is slightly greater than required or until pawl legs 68 engage stop abutments 98 of ratchet walls 80 adjacent sleeve 44. When the length of belt 20 that extends outwardly of the housing 30 is decreased, spring reel 46 moves carrier 58 to the left toward the fully retracted position. Thus, the bias of pawl legs 68 toward base wall 34 causes pawl legs 68 to frictionally engage the upper surfaces 96 of blocking members 84 and to move the blocking members 84 to unblocked positions, shown in FIGS. 6 and 8, as the carrier 58 moves in a retracting direction.

It should be noted that it is also possible to use a clip 100, FIG. 9, that is secured to a pawl leg 68 and has a portion 102 that is slightly hooked to engage edges 104 of a respective blocking member 84 and thereby move the respective blocking member 84 to the unblocked position.

With the blocking members 84 in the unblocked positions, the pawl legs 68 are free to engage the surfaces 82 of ratchet walls 80. A belt applied force thus causes carrier 58 to pivot about the engagement of the ends of pawl legs 68 and the surfaces 82 such that the base 66 of carrier 58 engages the cover wall 38 and thereby prevents movement of carrier 58 to a further extended position and further movement of belt 20 outwardly of housing 30. If the length of belt 20 that extends outwardly of housing 30 is greater than required, the length can be decreased to the required length and spring reel 46, in response thereto, moves the carrier 58 in a retracting direction to a corresponding extended position. During movement to the corresponding extended position, pawl legs 68 move in an undulating manner along ramp surfaces 106 of ratchet walls 80 and upper surfaces 96 of blocking members 84. Engagement of the pawl legs 68 and the corresponding surfaces 82 of the ratchet walls 80 will then prevent movement of carrier 58 from the corresponding extended position to any further extended position in the manner previously described.

When the carrier 58 is thus held in one of the extended positions, movement of the carrier 58 to a further extended position and movement of belt 20 outwardly of housing 30 is accomplished as follows: Belt 20 is first moved inwardly of housing 30 until carrier 58 moves to the intermediate position slightly retracted from the first extended position of the series. Outward movement of belt 20 then causes carrier 58 to move to the first extended position as pawl legs 68 move blocking members 84 to the blocked positions, in the manner previously described, thus allowing movement of carrier 58 to any extended position of the series.

The invention thus provides an automatic locking restraint belt linear retractor which holds the belt against outward movement after retraction of the carrier in any extended position of a series and which selectively allows further extending movement of the carrier and outward movement of the belt without first requiring the belt to assume the fully stowed position within the retractor housing.

It is claimed:

1. In an automatic locking restraint belt linear retractor including an elongated housing, a carrier mounted by the housing for movement in an extending direction toward one end of the housing in response to extending movement of a restraint belt, and retracting means biasing the carrier toward the other end of the housing in a retracting direction to retract the belt for stowage within the housing, the combination comprising:

a series of ratchet surfaces spaced longitudinally along the housing generally adjacent the one end thereof;

a pawl portion on the carrier for engagement with a selected ratchet surface to lock the carrier against extending movement and secure the belt in an extended position of a corresponding selected belt length; and elongated blocking means mounted on the housing for movement between blocked and unblocked positions and including blocking portions blocking engagement of the pawl portion and ratchet surfaces in blocked position, a first control portion on the blocking means engaged by the pawl portion to move the blocking means to blocked position during extending movement of the carrier from an intermediate position slightly retracted from the first ratchet surface of the series and thereby allowing belt movement to a fully extended position and consequent movement of the carrier to a position adjacent the last ratchet surface of the series, and a second control portion on the blocking means engaged by the pawl portion to move the blocking means to unblocked position during the initial retraction of the carrier and belt with the blocking means in blocked position and thereby selectively allowing engagement of the pawl portion and a selected ratchet surface to lock the carrier and secure the belt against extending movement.

2. In an automatic locking restraint belt linear retractor including an elongated housing having a pair of spaced generally parallel opposed walls extending along the length thereof, a carrier mounted by the housing for movement in an extending direction toward one end of the housing in response to extending movement of a restraint belt, and retracting means biasing the carrier toward the other end of the housing in a retracting direction to retract the belt for stowage within the housing, the combination comprising:

a series of ratchet surfaces spaced longitudinally along one of the walls of the housing generally adjacent the one end thereof;

the carrier including a base portion having a pawl portion extending therefrom for engagement with a selected ratchet surface to swing the base portion into engagement with the other wall of the housing in response to attempted extending movement of the belt and thereby locking the carrier against extending movement and securing the belt in an extended portion of a corresponding selected belt length; and elongated blocking means mounted on the housing for movement between blocked and unblocked positions and including blocking portions blocking engagement of the pawl portion and ratchet surfaces in blocked position, a first control portion on the blocking means engaged by the pawl portion to move the blocking means to blocked position during extending movement of the carirer from an intermediate position slightly retracted from the first ratchet surface of the series and thereby allowing belt movement to a fully extended position and consequent movement of the carrier to a position adjacent the last ratchet surface of the series, and a second control portion on the blocking means engaged by the pawl portion to move the blocking means to unblocked position during the initial retraction of the carrier and belt with the blocking means in blocked position and thereby selectively allowing engagement of the pawl portion and a selected ratchet surface to lock the carrier and secure the belt against extending movement.

3. In an automatic locking restraint belt linear retractor including an elongated housing having a pair of spaced generally parallel opposed walls extending along the length thereof, a carrier mounted by the housing for movement in an extending direction toward one end of the housing in response to extending movement of a restraint belt, and retracting means biasing the carrier toward the other end of the housing in a retracting direction to retract the belt for stowage within the housing, the combination comprising:

a series of ratchet surfaces spaced longitudinally along one of the walls of the housing generally adjacent the one end thereof;

the carrier including a base portion having a pawl portion extending therefrom;

spring means mounted on the base portion of the carrier and including a leg engaging the one wall of the housing to bias the base portion toward the other wall and the pawl portion toward the one wall for engagement with a selected ratchet surface to swing the base portion into engagement with the other wall in response to attempted extending movement of the belt and thereby locking the carrier against extending movement and securing the belt in an extended position of a corresponding selected belt length; and elongated blocking means mounted on the housing for movement between blocked and unblocked positions and including blocking portions blocking engagement of the pawl portion and ratchet surfaces in blocked position, a first control portion on the blocking means engaged by the pawl portion to move the blocking means to blocked position during extending movement of the carrier from an intermediate position slightly retracted from the first ratchet surface of the series and thereby allowing belt movement to a fully extended position and consequent movement of the carrier to a position adjacent the last ratchet surface of the series, and a second control portion on the blocking means engaged by the pawl portion to move the blocking means to unblocked position during the initial retraction of the carrier and belt with the blocking means in blocked position and thereby selectively allowing engagement of the pawl portion and a selected ratchet surface to lock the carrier and secure the belt against extending movement.

4. The combination of claim 3 wherein a generally channel shaped member has side walls defining the ratchet surfaces, with a pair of elongated blocking members reciprocally movable longitudinally of the housing respectively adjacent the side walls of the channel member to provide the blocking means, and with a pair of pawl portions extending from the base portion of the carrier for respective engagement with the blocking members and the ratchet surfaces of the channel member side walls to provide the selectively locking of the carrier and securement of the belt against extending movement.

5. The combination of claim 4 wherein the pawl portions include hooked portions for engaging the blocking members and moving these members to unblocked position in response to the initial retraction of the carrier and belt with the blocking members in blocked position.

References Cited
UNITED STATES PATENTS

| | | | |
|---|---|---|---|
| 3,174,704 | 3/1965 | Replogle | 297—388 UX |
| 3,486,792 | 12/1969 | Stoffel | 297—388 |
| 3,526,431 | 9/1970 | Boedigheimer et al. | 297—388 |
| 3,535,001 | 10/1970 | Lewis et al. | 297—388 |
| 3,545,788 | 12/1970 | Brawner | 297—388 |
| 3,547,490 | 12/1970 | Stoffel | 297—388 |
| 3,551,002 | 12/1970 | Dozois | 297—388 |

PAUL R. GILLIAM, Primary Examiner